March 31, 1953 W. F. EBERZ 2,633,472
REAGENT CONTROL METHOD AND APPARATUS
Filed Oct. 6, 1947

INVENTOR.
WILLIAM F. EBERZ
BY HIS ATTORNEYS.
HARRIS, KIECH, FOSTER & HARRIS
BY
Clarence F. Kiech Patented Mar. 31, 1953

2,633,472

UNITED STATES PATENT OFFICE 2,633,472

REAGENT CONTROL METHOD AND APPARATUS

William F. Eberz, Altadena, Calif., assignor to Petrolite Corporation, Wilmington, Del., a corporation of Delaware Application October 6, 1947, Serial No. 778,125

9 Claims. (Cl. 260—424)

My invention relates to the indication, determination or control of acidity or alkalinity of aqueous or non-aqueous systems by colorimetric methods. More particularly, the invention relates to a method and apparatus for regulating the amount of a substance added to a fluid to control some character of the fluid, for example, regulating the amount of an alkali added to an oil to control the activity of the hydrogen ion, typically its concentration. Hereinafter reference will be made to hydrogen ion concentration as synonymous with hydrogen ion activity, the more rigorous though less widely used term.

As herein used, the term "oil" has reference to any transparent, semi-transparent or translucent oil, such as petroleum oil, animal oils (including fish oils) and vegetable oils whether or not in the form of an oil-continuous emulsion or dispersion. The term "aqueous system" has reference to any aqueous liquid whether or not it is in the form of an emulsion or dispersion in which the aqueous phase is external. The term "non-aqueous system," if used without further qualification, refers to such an oil or to emulsions or dispersions in which the external phase is non-aqueous, any dispersed phase being an acid or alkaline substance, including aqueous solutions of such substances. For purpose of illustration the invention will be exemplified as applied to non-aqueous systems but it should be understood that numerous advantages arise from use of the principles of the invention in aqueous systems.

In general, it is an object of the present invention to provide a novel colorimetric method and apparatus for indicating, determining or controlling hydrogen ion concentration. Typically, the invention involves a method and apparatus for controlling the supply of an acid or an alkali to a main stream to react with this stream or some component thereof, the reagent being controlled to maintain the hydrogen ion concentration of the stream substantially constant. This is particularly desirable when the stream changes in composition or volume from time to time. The invention will be described specifically in connection with volumetric flow-rate control of a reagent of substantially constant concentration, but it should be understood that it is applicable also to the control of concentration of a reagent supplied at a substantially constant volumetric flow-rate, the phrase "controlling (or varying) the amount of reagent," as hereinafter used, being generic to both types of control.

Another object of the invention is to mix continuously a large-volume main stream of liquid with a small-volume reagent stream to form a large-volume mixed stream, hereinafter referred to as a "major stream," and to withdraw therefrom and colorimetrically test a small sample stream or "minor stream." It is another object to add to the sample or minor stream an indicator capable of changing color or of changing opacity with a change in acidity or alkalinity, typically an indicator capable of changing color with a small change in hydrogen ion concentration from a predetermined value. For convenience, the stream which results from mixing the indicator with the sample stream will be referred to as a "test stream."

Another object of the invention is to employ a transparent light-absorption cell for receiving the test stream and to employ a photoelectric cell or other light sensitive means for establishing an electrical potential which changes with variations of the color of the test stream or a component thereof as this stream passes through the absorption cell.

A further object is to employ an indicator whose color or light-absorptivity will vary markedly with changes in hydrogen ion concentration of the test stream to influence the photoelectric cell. Hereinafter when reference is made to change in color of the indicator, the term includes changes in light-absorptivity resulting from change in hydrogen ion concentration, whether or not visible as a change in color.

A further object is to employ, in connection with a photoelectric cell, a beam of substantially monochromatic light of a wave length such that relatively little of the light is absorbed by the liquid of the main stream or by the reagent or, desirably, by the indicator used, except as this indicator changes color, the light being then markedly absorbed.

A further object is to employ a photoelectric cell which is accurately responsive to such changes in color and to employ its variations in electrical potential to actuate any suitable means such as a control means for varying the amount of reagent added to the main stream in such manner as to maintain substantially constant the hydrogen ion concentration of this stream.

Often, the reaction between the main stream and the reagent is not completed instantaneously. In some instances there may be a delay of seconds or minutes before the reaction is complete and equilibrium is established. If the colorimetric determination of hydrogen iron concentration is delayed until equilibrium has been established, there may be a substantial time lag between the need for a change in the amount of reagent and the time that this change can be effected. It is an object of the present invention to eliminate such time lag in delayed-equilibrium systems by withdrawing the sample stream from the major stream before equilibrium has been reached and processing this sample stream to accelerate the reaction, the reaction preferably being complete by the time the colorimetric determination is made.

Another object of the invention is to add a suitable diluent to the sample stream or to the test stream. In this connection it is an object of the invention to employ a diluent capable of rendering the indicator substantially completely soluble in the test stream. Another object is to employ a diluent capable of dissolving organic materials which might otherwise deposit on the transparent cell walls or which will produce a cleansing effect acting to remove such deposits. This is important in the colorimetric determination because any such deposits would tend to reduce the light transmitted to the photoelectric cell and interfere with the desired control.

The invention contemplates the use of a small-volume test stream to minimize the amount of indicator and/or diluent required. For example, it is desirable that the flow-rate of the sample stream be about 0.1 to 5 ml. per minute. Commercially available pumps are not satisfactory for such very low rates of flow and cannot be relied upon to give accurate proportioning.

It is an object of the invention to provide a novel arrangement for accurately and continuously metering small streams, e. g., to meter and mix a small sample stream and a small stream of an indicator and/or diluent. Another object is to provide a metering system with a very small delay between the time the sample stream is withdrawn from the major stream and the time that the indicator and/or diluent is mixed therewith and the resulting test stream delivered to the colorimetric cell. In this connection it is an object to provide a pair of variable-volume devices to proportion and mix two liquids, one of these devices applying a positive pressure to one liquid so as to push it toward a mixing zone, the other device applying a reduced or negative pressure to the mixture beyond the mixing zone. A further object is to decrease the volume of the first variable-volume device at a certain rate and increase the volume of the second variable-volume device at a correspondingly higher rate during a major portion of the operating cycle. In the minor portion of this operating cycle, the first variable-volume device is quickly expanded and the second quickly compressed. The operating cycle may be of relatively long duration, typically from several minutes up to an hour or more in length so that pressure pulsations in the system are substantially eliminated. Such an arrangement permits the use of check valves, which normally are impractical when handling minute quantities of liquid subject to frequent pressure pulses.

The foregoing objects of my invention and the advantages suggested thereby, together with various other objects and advantages which will be evident hereinafter, may be realized through the employment of the exemplary embodiment illustrated in the accompanying drawing and described in detail hereinafter. Referring to the drawing.

Figure 1:
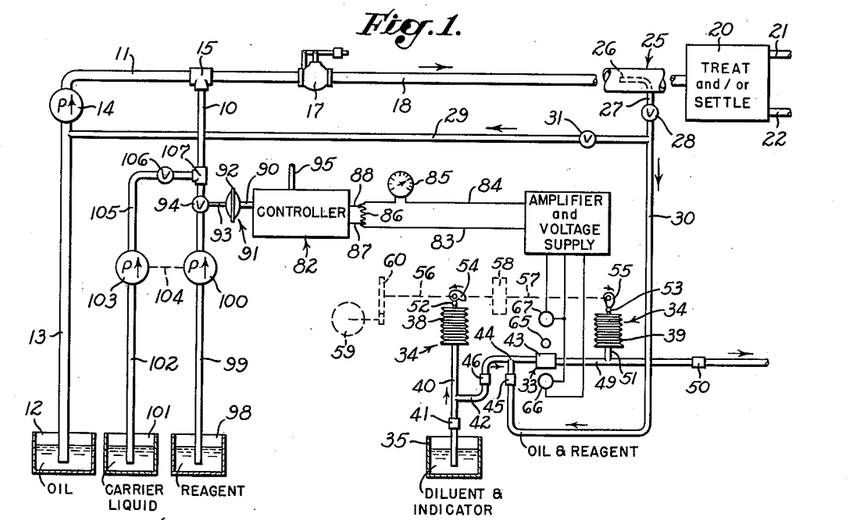
Fig. 1 is a diagrammatic view illustrating the preferred elements of my flow control apparatus when employed for controlling the amount of reagent supplied to an oil stream.

Referring to Fig. 1 of the drawing, the control apparatus illustrated therein is particularly adapted to regulate the amount of a reagent flowing through a line 10 which is supplied to an oil stream flowing through a line 11. The oil, which may be a petroleum distillate such as diesel fuel, for example, may be withdrawn from a storage tank 12 through a line 13 leading to a pump 14 which forces the oil under pressure through the line 11 past the junction 15 of the lines 10 and 11 where the reagent is added to the oil stream as a continuously flowing stream controlled in volume in a manner to be described in more detail hereinafter.

Although the reagent and oil streams flowing in the lines 10 and 11 mix to some extent at the junction 15, an additional mixing action may be provided, if desired, by a mixing means 17, which is shown as a weight-loaded valve for illustrative purposes. In the event that the reagent is substantially immiscible with the oil, it is desirable that the mixing means 17 be capable of dispersing the reagent in the oil in the form of small droplets so as to produce an oil-continuous emulsion.

The stream of the oil-reagent mixture, hereinafter termed the "major stream," flows through a line 18 to treating, processing, or settling equipment which is indicated generally by the numeral 20 and which, per se, forms no part of the present invention. For example, if the equipment 20 serves to separate the phases of an emulsion flowing through the line 18, it may be equipped with an effluent line 21 for discharging the separated or treated oil and an effluent line 22 for discharging the separated reaction products resulting from a chemical reaction between the reagent and some component of the oil. In the equipment 20 any suitable aid for effecting such separation may be employed.

For the purpose of this disclosure, it is not necessary to describe the various treatments or processing steps which may be performed by the equipment 20, the invention being primarily concerned with regulating the amount of reagent which is supplied through the line 10 to compensate for changes in some chemical characteristic of the oil stream or changes in the volume thereof. For example, the line 11 may carry a stream of a mineral oil distillate such as diesel fuel containing organic acids which vary in kind or amount from time to time. It is often desirable to neutralize such acidity to some extent by mixing an alkaline reagent with the stream of oil, the present invention, in one of its applications, being directed to controlling the amount of the alkaline reagent which is supplied to the stream of oil flowing in the line 11 through the line 10 in such a manner that the acidity or alkalinity, i. e., hydrogen ion concentration, of the oil-reagent or major stream flowing through the line 18 is maintained substantially constant within predetermined limits to aid in subsequent treatment, processing, or settling by the equipment 20, or for other purposes.

As previously mentioned, it is usually impractical to work with the entire major stream in determining the hydrogen ion concentration thereof and I prefer instead to work with a small sample of the major stream, the apparatus being provided with a sampling device 25 which withdraws a small portion of the major stream for this purpose. In its simplest form, the sampling device 25 may merely consist of a small tube 26 which is centered in the line 18 and having an open end which faces upstream to withdraw a representative small portion of the major stream. The tube 26 is connected to a line 27, flow through which is regulated by a valve 28.

I prefer to withdraw through the line 27 a stream of somewhat larger volume than that which is actually required by the colorimetric system to be described hereinafter. As indicated in Fig. 1 of the drawing, the stream flowing through the valve 28 is divided into two portions, viz., a by-passed portion flowing through a line 29, and another portion forming a sample or minor stream flowing through a line 30 to the colorimetric system. Although the by-passed portion flowing through the line 29 may be discarded, it is preferably returned to the oil stream on the intake side of the pump 14, the line 29 being shown connected to the line 13 for this purpose. The volumetric flow rate of this by-passed portion is quite small, although often substantially larger than that of the sample stream, and can be regulated manually by means of a valve 31 in the line 29.

If the sample or minor stream flowing through the line 30 is a multiple-phase stream, it is desirable to convert it into a homogeneous stream before delivering it to the colorimetric system, which is indicated generally by the numeral 33. If the reaction between the reagent added to the oil stream and the desired component of the oil stream has not been completed, it is also desirable to accelerate this reaction so that it is complete, or at least substantially complete, before the sample stream is delivered to the colorimetric system 33. Moreover, in systems other than non-aqueous, as well as in those of a non-aqueous nature, it is highly desirable that any foreign materials which tend to settle out or deposit, such as color bodies, polymers, dirt, etc., be retained in solution to prevent interference with the operation of the colorimetric system 33 as will be discussed in more detail hereinafter. The foregoing and other desirable functions may be performed by a suitable diluent, preferably of the alcoholic type, mixed with the sample stream, this diluent preferably being completely miscible with the oil. In addition, if the sample stream flowing through the line 30 is of a multiple-phase nature, the diluent should be of such character and used in such amount as to convert the sample stream from a heterogeneous to a homogeneous stream.

Various alcohols, such as ethyl, methyl, propyl, isopropyl, normal butyl, secondary butyl, and amyl alcohol, can be employed as the diluent with varying degrees of effectiveness and can be employed with or without small amounts of water. If the sample stream is multiple-phase in nature, e. g., an oil containing dispersed aqueous droplets, the alcoholic diluent should be of such a character and should have such a small amount of water, if any, that a homogeneous sample stream will be obtained. Moreover, the diluent should be of such a nature and should be used in amounts such that the indicator employed in connection with the colorimetric system 33 is rendered completely soluble in the sample stream to provide a satisfactory medium for its operation, and should be capable of acting as a solvent for low-solubility organic materials which may be contained in the sample stream so as to retain such materials in solution to prevent their interfering with the operation of the colorimetric system as will be discussed in more detail hereinafter.

Extensive tests have shown that secondary butyl alcohol is preferable as the most versatile diluent for performing the foregoing functions in connection with various oils, the preferred diluent comprising secondary butyl alcohol containing about 6% water by volume. The amount of the alcoholic diluent to be mixed with the sample stream will vary somewhat with different oils and will depend somewhat on the functions to be performed thereby. Usually, when working with such petroleum distillates as diesel fuels, the volumetric flow rate of the alcoholic diluent will be approximately twice that of the oil-reagent mixture in the sample stream with which the diluent is mixed. However, the optimum proportions of the diluent stream and the sample stream may deviate from this value somewhat, as noted above.

As best shown in Fig. 1 of the drawing, the apparatus includes means 34 for metering the proper proportions of the diluent and the oil-reagent mixture and for bringing them together and delivering them to the colorimetric system 33. Although the indicator employed in connection with the colorimetric system may be metered separately if desired, I prefer to mix the indicator with the diluent in a suitable container 35 prior to metering of the diluent by the metering means 34 so that the metering means will meter the proper amounts of the diluent and indicator simultaneously. The amount of the indicator which is mixed with the diluent need be sufficient only to produce the color changes with changes in hydrogen ion concentration which are required for the operation of the colorimetric system 33, the nature of the indicator being discussed in more detail hereinafter.

Considering the metering means 34 in more detail, since the sample stream containing the diluent and indicator, hereinafter termed the "test stream," usually cannot be returned to the major stream, in order to avoid contamination of the latter, the test stream is preferably disposed of in any suitable manner. Consequently, in order to avoid waste, the flow rate of the oil-reagent and diluent-indicator mixtures used to form the test stream are preferably held to very small values, it being contemplated that the amount of diluent used be held to approximately one liter per day as an example. Accordingly, it is necessary that the metering means 34 be capable of delivering the oil-reagent and diluent-indicator mixtures to the colorimetric system 33 at flow rates in the vicinity of from 0.1 to 5 ml. per minute, for example. Moreover, the metering means must be capable of operating at such flow rates while metering the amount of the oil-reagent and diluent-indicator mixtures forming the test stream accurately and without introducing any undue lag between the time that the sample stream is withdrawn from the major stream and the time that the test stream is delivered to the colorimetric system 33. The manner in which the metering means 34 operates to perform the foregoing functions will be evident from the description thereof in the following paragraphs.

As shown diagrammatically in Fig. 1 of the drawing, the metering means 34 includes a pair of variable volume chambers typically provided by bellows pumps 38 and 39. The bellows pump 38 communicates with the container 35 for the diluent-indicator mixture through a line 40 which is provided with a check valve 41 therein for the purpose of preventing reverse flow from the pump to the container. A branch line 42 leads from the line 40 to a light absorption cell 43 which forms part of the colorimetric system 33 as will be described in more detail hereinafter, the line 30 for the sample stream of the oil-reagent mixture being connected to the line 42 at a junction upstream from the cell 43 as indicated by the numeral 44, the junction representing a mixing means. Check valves 45 and 46 are located in the lines 30 and 42, respectively, for the purpose of preventing back flow of the oil-reagent sample stream and of the diluent-indicator stream, respectively. The test stream resulting from mixing of the oil-reagent and diluent-indicator streams at the junction 44 flows through the cell 43 into a discharge line 49 which is provided with a check valve 50 therein for preventing reverse flow of the test stream, the bellows pump 39 being connected to the discharge line 49 by a line 51. Any suitable auxiliary mixing device may be employed at the junction 44 or between this junction and the cell 43 to insure a thorough mixing of the oil-reagent and diluent-indicator stream.

Figure 2A:
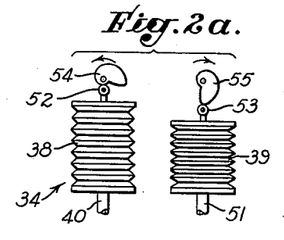
Figs. 2a, 2b and 2c are enlarged, diagrammatic views illustrating the operation of a metering means which forms part of the apparatus.
Figure 2B:
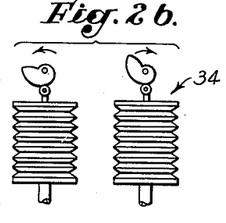
Figure 2C:
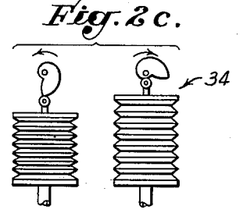

The bellows pumps 38 and 39 provide cam followers 52 and 53 operated by cams 54 and 55, respectively, which rotate in opposite directions as viewed in Figs. 2a, 2b and 2c and as indicated by the arrows thereadjacent. The bellows may be sufficiently resilient to retain their cam followers 52 and 53 in contact with the cams and draw fluid into the bellows, or springs can be used to maintain the bellows in contact with the cams. A driving connection between the cams 54 and 55 is shown diagrammatically in Fig. 1 of the drawing and may include shafts 56 and 57 connected by a gear assembly 58 which reverses the direction of rotation of the shaft 57 with respect to that of the shaft 56. The shaft 56 may be driven by a motor 59, for example, through a suitable reduction gear system 60. Alternatively, both cams 54 and 55 may be mounted on the shaft 56 to turn therewith and in the same direction, one cam being then the mirror image of the other.

The operating cycle of the metering means 34 may conveniently be considered as comprising two parts, viz: a first or primary part during which the cam 54 compresses the bellows pump 38 to its minimum volume while the cam 55 permits the bellows pump 39 to expand to its maximum volume; and a secondary part during which the cam 54 permits the pump 38 to expand to its maximum volume while the cam 55 compresses the pump 39 to its minimum volume. For a reason which will be made apparent hereinafter, the cams 54 and 55 are so contoured that the pumps 38 and 39 are expanded and contracted, respectively, rather abruptly during the secondary part of the operating cycle so that only a very small portion of the duration of the entire cycle elapses during the secondary part thereof, the liquid flow through the light absorption cell 43 being stopped during the secondary part of the operating cycle.

Thus, at the end of the primary part of the operating cycle, the cam 54 rotates into a position such that the bellows pump 38 is permitted to expand abruptly, whereby this pump draws a quantity of the diluent-indicator mixture from the container 35 upwardly through the line 40 past the check valve 41, back flow through branch line 42 being prevented by the check valve 46. Subsequently, during the primary part of the operating cycle, the cam 54 compresses the bellows pump 38 slowly and linearly with time so as to expel the diluent-indicator mixture therefrom and to push it through the line 42 past the check valve 46 to the junction 44, reverse flow to the diluent-indicator container 35 being prevented during the primary part of the cycle by the check valve 41. The contour of the cam 54 which operates the bellows pump 38 is such that the diluent-indicator mixture is pushed through the branch line 42 at precisely the volumetric flow rate required to obtain the desired proportion of the diluent-indicator mixture in the test stream formed at the junction 44 of the lines for the diluent-indicator and oil-reagent streams.

While the bellows pump 38 is being compressed slowly by the cam 54 in this manner, the cam 55 permits the bellows pump 39 to expand at a greater volumetric rate. This not only acts to draw the test stream, formed at the junction 44, through the cell 43, but also meters and draws into the junction 44 a proportional amount of the oil-reagent mixture from the line 30, this amount being determined by the difference in volumetric rates of change of the bellows pumps 38 and 39. During expansion of the bellows pump 39, reverse flow in the outlet end of the discharge line 49 is prevented by the check valve 50. It will be apparent that the rate at which the volume of the bellows pump 38 is decreased by the cam 54 during the primary part of the operating cycle will determine the rate at which the diluent-indicator mixture is delivered to the junction 44, and the increased rate at which the volume of the bellows pump 39 increases as it is permitted to expand by the cam 55 will determine the rate at which the test stream is drawn through the cell 43 and also the rate at which the oil-reagent mixture is delivered to the junction 44. Correspondingly, the rate of volume decrease of the bellows pump 38 must be equal to the desired volumetric flow rate of the diluent-indicator mixture, and the rate of volume increase of the bellows pump 39 must be equal to the volumetric rate of flow of the diluent-indicator mixture plus that of the oil-reagent mixture comprising the test stream, the difference between the rate of volume increase of the pump 39 and the rate of volume decrease of the pump 38 being equal to the volumetric flow rate of the oil-reagent mixture. It will be understood that this difference may be obtained by making the difference between the maximum and minimum lengths of the bellows pump 39 greater than that of the pump 38 if the pumps are of the same diameter or by using pumps of the same maximum length but of different diameter or by using pumps which differ both in such maximum lengths and in diameter.

At the end of the primary part of the cycle, the cam 55 abruptly compresses the bellows pump 39 to its minimum volume so that the test mixture inhaled thereby is expelled through the discharge line 49 through the check valve 50, back flow being prevented during this expulsion process by the check valves 45 and 46. At the same time, the cam 54 permits the bellows pump 38 to expand quickly to its maximum volume so as to draw in a fresh charge of the diluent-indicator mixture past the check valve 41. Subsequently, the cam 54 gradually decreases the volume of the bellows pump 38 and the cam 55 gradually permits the volume of the pump 39 to increase so as to meter the diluent-indicator and oil-reagent mixtures during a repetition of the primary part of the operating cycle.

It will be apparent that the metering means 34 thus delivers the test mixture consisting of the proper proportions of the diluent-indicator and oil-reagent mixtures to the cell 43 in the form of a stream which flows continuously except for the brief interval taken up by the secondary part of the operating cycle, which interval is preferably made very small by properly contouring the cams 54 and 55 as previously discussed. The operating cycle of the metering means 34 is preferably relatively long, e. g., one hour more or less, so that pressure pulsations in the system are created only at infrequent intervals. Consequently, the frequency of operation of the check valves 41, 45, 46 and 50 will be relatively low so that wear of these check valves is reduced to a negligible factor. Moreover, the performance of the check valves 45 and 46 may be relatively poor without seriously affecting the operation of the metering means. The check valves 41 and 50 are more critical, however, since they must remain closed for extended periods of time during the primary part of the operating cycle whereas the check valves 45 and 46 are open most of the time. Consequently, the check valves 41 and 50 must be maintained in proper operating condition since any appreciable leakage past these valves would affect the accuracy of the metering means to some extent.

I have found tht the metering means 34 will meter and mix fluids accurately at flow rates as low as 0.1 to 5 ml. per minute, for example, and will operate satisfactorily for extended periods of time. The metering means thus permits using only very small quantities of the oil-reagent and diluent-indicator mixtures, the use of only one liter of diluent per day, for example, being entirely practicable, which is an important feature of the invention.

Figure 3:
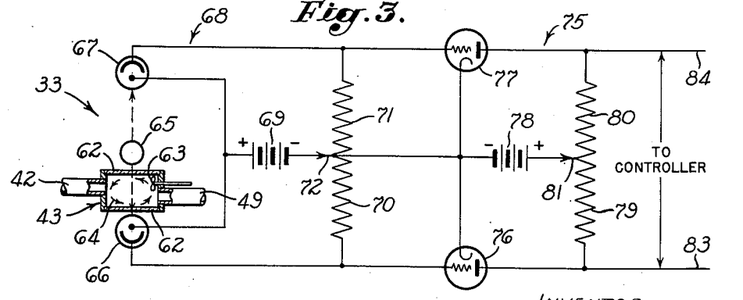
Fig. 3 is a wiring diagram of a colorimetric system which forms part of the apparatus.

As best shown in Fig. 3, the light-absorption cell 43 may merely be a transparent or translucent chamber whose opposed walls 62 are formed of glass or other suitable materials, the cell being connected to the lines 42 and 49 as previously discussed.

In order to keep foreign materials from depositing on the walls 62 of the cell 43 to avoid interference with the operation of the colorimetric system 33, the diluent employed is preferably one which is capable of dissolving such foreign materials so as to retain them in solution, regardless of whether the colorimetric system is employed for aqueous or non-aqueous mixtures. In the exemplary application under consideration, the preferred diluent is an alcohol, preferably secondary butyl alcohol, its function being to insure a clear, homogeneous oil-reagent mixture, and to provide a satisfactory medium for the indicator as well as to maintain the walls 62 of the cell 43 free from deposits since the foreign materials most commonly found in oils or their distillates are of an organic nature and are readily soluble in secondary butyl alcohol. However, in other applications, it may be desirable to use other diluents, or a mixture of diluents, to obtain the desired cleansing effect for the cell 43.

Since the proper functioning of the cell depends to a considerable degree upon maintenance of clean cell walls, additional expedients may be employed where this is found necessary. For example, a small quantity of a suitable detergent may be added, desirably in solution in the diluent used, the detergent being selected from the types which do not act upon the chosen indicator, and which do not undesirably alter the optical characteristics of the system.

Another aid in maintaining clarity of the transparent cell walls, is a stirring device incorporated in the cell in such a manner as not to interfere with the light beam, and designed to provide a washing action on these walls, thereby minimizing the deposition of foreign matter. Such a stirring device is suggested in Fig. 3 as a small propeller-like paddle 63 driven from a connected shaft to circulate the liquid in the cell in washing relationship with the walls 62 and in a closed path indicated by arrows 64.

As best shown in Figs. 1 and 3, the colorimetric system 33 includes a light source 65 which is adapted to direct a beam of light through the light-absorption cell 43 against a photoelectric cell 66. The light source 65 is also preferably adapted to direct another beam of light against a second photoelectric cell 67, the two photoelectric cells being connected in a bridge circuit 68 which includes a source of potential such as a battery 69, and which includes a potentiometer having resistor sections 70 and 71 that are variable by means of a slider 72 to balance the circuit. Associated with the bridge circuit 68 is an amplifier circuit 75 which may include amplifier tubes 76 and 77, a source of potential such as a battery 78, and a potentiometer comprising resistor sections 79 and 80 which are relatively variable by means of a slider 81 when balancing the circuit. The output side of the amplifier circuit 75 may be connected to a controller, indicated generally by the numeral 82 of Fig. 1, by conductors 83 and 84, the controller 82 being adapted to regulate the amount of reagent added to the stream of oil flowing through the line 11 in a manner to be described hereinafter.

Considering the operation of the colorimetric system 33, it will be apparent that the potential between the output leads 83 and 84 of the amplifier circuit 75 is variable in polarity or magnitude with variations in the amount of light from the source 65 passing through the test stream in the cell 43 and reaching the photoelectric cell 66, and is, therefore, variable with the light transmissivity of the test stream. The light transmissivity of the test stream is variable with variations in the color of the indicator contained therein which, in turn, depends upon the hydrogen ion concentration of the stream. Thus, any variations in the acidity or alkalinity of the test stream ultimately appear as variations in the potential between the output leads 83 and 84 of the amplifier circuit 75. The colorimetrically derived potential between these leads may be supplied to any suitable reagent control equipment, such as the controller 82, for the purpose of varying the amount of reagent added to the oil stream flowing in the line 11 in such a manner as to maintain the hydrogen ion concentration of the major stream flowing through the line 10 substantially constant at a predetermined value as will be discussed in more detail hereinafter.

Various factors must be taken into consideration in connection with the colorimetric system 33 and the indicator employed in connection therewith. In the first place, most commercially available indicators whose colors are variable with hydrogen ion concentration will operate throughout only a relatively small range, e. g., 0.5 to 1.0 pH units in water solution. Consequently, the indicator employed must be one which is color sensitive in the range of hydrogen ion activity values corresponding to that at which the oil-reagent mixture is to be maintained. By employing suitable indicators, or indicator mixtures, any desired operating range may be obtained depending upon the particular hydrogen ion activity value at which the oil-reagent mixture is to be maintained.

Another factor which must be taken into consideration with regard to the colorimetric system 33 and the indicator employed in connection therewith is the fact that any variations in the color of the oil stream itself tend to produce variations in the colorimetrically derived potential applied to the controller 82. Consequently, it is desirable that the colorimetric system 33 operate on a color or wave length of light which is least absorbed by the oil in its darkest form. For petroleum distillates, such as diesel fuels, having a color of 8 N. P. A. units, for example, the most satisfactory light is red light having a wave length of from 5900 to 6550 Angstrom units, although it is necessary to employ light of other wave lengths in connection with oils or distillates of other colors. The indicator employed should be one whose light absorptivity at the selected wave length changes markedly with changes in the hydrogen ion activity of the test stream through which the light beam is directed. Thymolphthalein and the alkaline ranges of thymol blue and bromthymol blue afford satisfactory changes in absorption of light of the wave length mentioned and are also suitable for use with the particular petroleum distillate mentioned. Since the foregoing indicators have different operating ranges, the oil-reagent stream flowing through the line 18 may be maintained at various hydrogen ion concentrations through their use.

Preferably, the light source 65 should be substantially monochromatic so that when the test stream flowing through the cell 43 contains an indicator in its transmitting form, e. g., the yellow form of bromthymol blue, only that color of light which is selected for the operation of the colorimetric system 33 may reach the photoelectric cell 66. For example, a light source 65 which operates by electrical conduction through gaseous neon provides a fairly pure red light of the wave length mentioned above without the use of any filters. As another example, an incandescent light combined with suitable slits and a prism serves as a good source of monochromatic red light. However, although an incandescent light source used with a red filter can be made to operate, it is relatively unsatisfactory since it emits a great deal of infra-red light which is difficult to absorb without absorbing all of the red light of the desired wave length.

The photoelectric cells 66 and 67 are preferably of the type whose response is relatively great for the color of the desired wave length and relatively small for other wave lengths. With the particular petroleum distillate and wave length mentioned above, I have found that RCA 926 photoelectric cells are very satisfactory, although other photoelectric cells may be employed when dealing with other oils and with light of other wave lengths. The RCA 926 photoelectric cell is particularly useful with light having a wave length from 5900 to 6550 Angstrom units since its response to light of wave lengths outside of this range is quite small, particularly as regards the difficultly removable infra-red light.

As previously mentioned, the colorimetrically derived potential between the output leads 83 and 84 of the amplifier circuit 75 may be employed to indicate the hydrogen ion concentration of the test stream, to indicate the amount of reagent which is required to keep the oil-reagent stream flowing through the line 18 at the proper hydrogen ion value, or may be employed to operate the controller 82 to regulate the flow of reagent automatically as in the construction shown in the drawing.

If desired, the output potential may be supplied to a meter 85, which may be a milliammeter calibrated in pH units to give a desired indication of the relative hydrogen ion activity of the test stream in terms of pH units. However, the readings with a non-aqueous system such as that specifically considered herein will usually not correspond numerically to the pH values commonly encountered in aqueous systems. The meter 85 is shown diagrammatically as being connected in series with an impedance 86 across the output leads 83 and 84. The controller 82 receives the colorimetrically derived potential from conductors 87 and 88 tapped across a portion of the impedance 86. If desired, the controller 82 may include an additional amplifier, the output of which may be employed to control the amount of reagent added to the oil stream flowing through the line 11.

Although the controller 82 may be of any suitable type, I have shown a controller of the so-called pneumatic type in the drawing for the purpose of illustration. The output of the controller amplifier, if such an amplifier is employed, is delivered to an electrically operated valve (not shown) which controls the flow of air through a line 90 to and from a diaphragm unit 91 to control the pressure applied to the right side of a diaphragm 92, the latter being connected to a stem 93 of a control valve 94 which varies the flow of the reagent through the line 10. Compressed air is supplied to the controller 82 through a line 95, the pressure of the air delivered to the diaphragm unit 91 being controlled by the previously mentioned valve in the controller. It will be understood that the pneumatic type controller 82 used with the meter 85 is merely illuustrative of one of a number of means for actuating the control valve 94 in response to variations in the electrical potential developed by the colorimetric system 33.

The amount of reagent added to the stream of oil may be regulated by the controller 82 in various ways, two different ways being suggested in Fig. 1. In the first place, a reagent of a predetermined concentration may be withdrawn from a container 98 through a line 99 by a pump 100 which delivers it at substantially constant pressure to the control valve 94 and thence to the line 10. In this system the volumetric flow rate of a reagent of a constant, predetermined concentration is controlled in such a manner as to maintain the hydrogen ion concentration of the oil-reagent stream flowing through the line 18 substantially constant.

In the second place, the volumetric flow rate of the reagent delivered to the line 10 may be maintained relatively constant while the concentration thereof is varied by means of the colorimetric system 33 and controller 82. This system is particularly suited to installations in which the reagent includes two components, e. g., an acid or alkali and a carrier such as water, alcohol, etc. In such a system, a relatively concentrated acid or alkaline solution may be present in the container 98 and may be withdrawn therefrom by the pump 100 under the control of the valve 94 as previously discussed. In addition, the carrier liquid, e. g., water, alcohol, etc., may be stored in a container 101 and may be withdrawn therefrom through a line 102 by a pump 103, the pumps 100 and 103 preferably being interconnected as indicated diagrammatically by the dotted line 104 and being connected to a suitable drive means (not shown). The pump 103 delivers the stream of carrier liquid withdrawn from the container 101 through a line 105 and valve 106 to the line 10 at a junction 107 downstream from the control valve 94, where it mixes with the stream in the line 10 to form the reagent which is continuously mixed with the oil stream in the line 11. In this system, a reagent of variable concentration is delivered to the oil stream while the volumetric flow rate thereof may be substantially constant, the concentration of the reagent being regulated by the control valve 94 under the influence of the controller 82 and the colorimetric system 33.

As an example of the operation of my flow control apparatus and method, it will be assumed that a stream of a mineral oil distillate such as diesel fuel, one of the many fluids which may be processed in accordance with the invention, is to be partially or completely neutralized. Diesel fuel usually contains naphthenic acids which may be recovered by mixing an alkaline solution with the stream of fuel to react with the naphthenic acids so as to form corresponding napthenates. These can be separated from the distillate stream in the equipment 20, a soap stock effluent being discharged through the line 22 and a diesel fuel effluent being discharged through the line 21. In order to insure a complete separation of the soap stock as well as to perform other desirable functions, the amount of reagent added to the stream of diesel fuel should be correlated accurately with the naphthenic acid content of the fuel, which content may change from time to time. The present invention is particularly well suited for such processing of diesel fuels and its operation in this connection is explained in the following paragraphs.

The diesel fuel is pumped along the line 11 by the pump 14 and an alkaline solution, typically an aqueous solution of about 0.25 to 1.0 N, is drawn from the container 98 by the pump 100 and is delivered to the junction 15 under the control of the valve 94, the valve 106 being closed in this example of the operation of the apparatus. The alkaline solution mixes with the oil stream at the junction 15 to some extent, but it is often desirable, both for the purpose of the present invention and for the effectiveness of the naphthenic acid recovery process, to mix the resulting oil-reagent or major stream additionally through the action of the mixing means 17. The mixing means produces a non-aqueous, multiple-phase stream which comprises an external phase of the diesel fuel and an internal phase of minutely dispersed droplets of the alkaline reagent reacting with the naphthenic acids in the oil to form dispersed reaction products which include particles of aqueous soap stock. In the example under consideration, the major stream flowing through the line 18 represents a heterogeneous system, usually an emulsion, and the reaction between the alkali and any acids contained in droplets dispersed in the oil (e. g., sulfonic acids from a sulfuric acid treatment) takes place only as fast as the alkali diffuses to the interfaces of such acid droplets. In such an installation, the heterogeneous stream is preferably sampled shortly after the emulsion is formed and even before the reaction between the alkali and the acids is complete.

In sampling the major stream flowing through the line 18, the valves 28 and 31 are preferably set to withdraw a stream which is larger than the sample stream to be delivered to the metering means 34 in order to insure a representative sample stream. The excess withdrawn by the sampling means 25 is preferably returned to the system at the inlet side of the pump 14 via the line 29 as previously discussed. The metering means 34 accurately meters the oil-reagent mixture from the line 30 and the diluent-indicator mixture from the container 35 in the proper proportions, the meter quantities of the oil-reagent and diluent-indicator mixtures being brought together and delivered to the colorimetric system 33 in the form of a test stream. In the particular application of my invention which is under consideration, the diluent is preferably secondary butyl alcohol and the volumetric ratio of the diluent to the oil-reagent mixture is preferably approximately 2:1. Various indicators, such as thymolphthalein or the alkaline ranges of thymol blue and bromthymol blue may be employed in connection with the particular mineral oil distillate under consideration, the indicator preferably being mixed with the diluent preliminarily as previously discussed. The indicator need be used only in sufficient quantities to provide the necessary color or light transmissivity changes with variations in hydrogen ion concentration of the test stream which are required for the operation of the colorimetric system 33.

In the example under consideration, a light source 65 which is capable of directing a beam of substantially monochromatic light of a wave length in the range of from 5900 to 6550 Angstrom units through the test stream flowing through the cell 43 is preferably employed. Variations in the color of the indicator contained in the test stream produce variations in the amount of light which reaches the photoelectric cell 66, and thus produce variations in the electrical potential between the output leads 83 and 84 of the amplifier circuit 75. Such variations in the output potential result in variations in the setting of the control valve 94 by the pneumatic controller 82, so as to maintain the rate of flow of reagent through the line 10 at a value which will maintain the hydrogen ion concentration, or pH value, of the oil-reagent stream flowing through the line 18 substantially constant at a predetermined value. If desired, the output potential may also be employed to operate the meter 85, but, as previously mentioned, the pH values indicated by the meter when the apparatus is used with the non-aqueous system under consideration will not correspond numerically to the pH values commonly encountered in aqueous systems.

It will thus be apparent that my invention may be employed for controlling the hydrogen ion activity of the stream of diesel fuel by varying the amount of alkaline reagent added to the stream in accordance with the color of the indicator contained in the test stream, which color depends upon the hydrogen ion activity of the test stream. In a similar way, the invention may be applied to neutralizing or partially neutralizing other animal, vegetable, or mineral oils containing acids, which are either naturally present or which are present because of prior processing. In other instances the invention is applicable to the acid treatment of such oils wherein acids are added either for the purpose of reacting with alkaline materials which may be present or for the purpose of reacting with other acid-reactable components which may be present, as in the acid refining of mineral oil distillates. However, in such other applications, the numerical values cited for illustrative purposes in connection with the specific application which has been considered herein may not apply and may have to be modified to fit the circumstances of a particular application.

While the invention has been described with particular reference to non-aqueous systems, it will be clear that many features thereof can be employed in connection with other than non-aqueous systems for controlling the amount of a reagent or other substance which is to be added. Although it may not be necessary to employ a diluent for homogenizing sample streams in aqueous systems, the use of a diluent is highly desirable in such systems to provide a proper operating medium for the indicator and to retain foreign materials in solution so that they will not deposit on the walls of the cell 43 and interference with the operation of the colorimetric system 33.

Since various changes, modifications and substitutions can be made without departing from the spirit of the invention, I hereby reserve the right to all such changes, modifications and substitutions as properly come within the scope of the appended claims.

I claim as my invention:

1. A colorimetric method for controlling the amount of a reagent mixed with a liquid to produce a mixture which contains a suspended material that tends to be deposited on transparent cell walls, which method includes the steps of: mixing streams of said liquid and said reagent to form a major stream of said mixture; continuously mixing with at least a portion of said major stream both an alcoholic diluent to dissolve said material and to prevent said depositing of said material and an indicator the color of which is variable with the hydrogen ion activity of said portion, the alcoholic diluent having the effect of producing a single phase solution and rapidly completing any previously incomplete reaction between the reagent and the liquid so that the indicator will respond to the total hydrogen-ion concentration of such completely reacted mixture; flowing the resulting stream in contact with said cell walls while directing light rays through these walls and the stream flowing there-adjacent; and varying the amount of said reagent mixed with said liquid in response to changes in the amount of light absorbed by said indicator.

2. A colorimetric method for controlling the amount of a reagent mixed with a liquid to produce a mixture which contains a material that tends to be deposited on transparent cell walls, which method includes the steps of: mixing streams of said liquid and said reagent to form a major stream of said mixture; continuously mixing with at least a portion of said major stream an alcoholic diluent to dissolve said material and prevent depositing thereof, a small quantity of a detergent and an indicator which changes in color with change in hydrogen ion activity of said portion, the alcoholic diluent having the effect of producing a single phase solution and rapidly completing any previously incomplete reaction between the reagent and the liquid so that the indicator will respond to the total hydrogen-ion concentration of such completely reacted mixture; flowing the resulting stream in contact with said cell walls while directing light rays through these walls and the stream flowing in contact therewith, said diluent and said detergent preventing substantial deposition of said material on said transparent cell walls; and varying the amount of said reagent mixed with said liquid in response to changes in the amount of light absorbed by said indicator.

3. A continuous reagent-control method, including the steps of: continuously mixing streams of oil and an aqueous reagent reactable with at least some component of the oil to form a major stream of oil-continuous material containing a dispersed phase; continuously sampling said major stream by withdrawing a small sample stream of said oil-continuous material therefrom; continuously mixing with said sample stream an alcoholic diluent which is completely miscible with said oil and said dispersed phase to form a stream of diluted liquid; continuously mixing with said sample stream an indicator the color of which changes with change in hydrogen ion activity of said sample stream; and varying the amount of said reagent which is continuously mixed with said stream of oil in response to change in the color of the indicator to maintain the hydrogen ion activity of said stream of diluted liquid substantially constant.

4. In an apparatus for controlling the amount of a reagent which is continuously delivered as a stream to a stream of liquid to be treated and which is mixed therewith to form a major stream flowing in a conduit, the combination of: a mixing means having a discharge line; a first positive-displacement proportioning pump and means for connecting same to said mixing means to deliver thereto a modifying liquid at a rate determined by the volumetric displacement rate of said first pump, said modifying liquid including an indicator whose color is variable with hydrogen ion activity of the liquid of said major stream; a sample line extending between said conduit and said mixing means for conducting a sample stream from the former to the latter; a second positive-displacement proportioning pump intaking from said discharge line, said second pump having a higher volumetric displacement rate than that of said first pump and thus drawing said sample stream into said mixing means through said sample line at a volumetric rate corresponding to the difference in volumetric displacement rates of said pumps; a drive for said first pump; a drive for said second pump, said drives respectively driving said first and second pumps at said volumetric displacement rates; a cell in said discharge line between said mixing means and said second pump, said cell receiving the mixed materials of said sample stream and said modifying liquid issuing from said mixing means; electric means for establishing an electric potential varying with changes in color of said mixed materials in said cell; control means for regulating the amount of the reagent which is continuously delivered to and mixed with the stream of liquid to be treated; and means movable in response to variations in said electrical potential for operating said control means to vary the amount of reagent delivered to the stream of liquid to be treated in a manner to maintain the hydrogen ion activity of said sample stream substantially constant.

5. A method of controlling the amount of a reagent which is continuously mixed with a stream of oil to produce a stream of a multiple-phase, oil-continuous liquid, which method includes the steps of: withdrawing a small sample stream from said stream of multiple-phase, oil-continuous liquid; mixing together an indicator, the color of which varies with hydrogen ion activity of said sample stream when introduced thereinto, and an alcoholic diluent in which is soluble the indicator and the phases of said oil-continuous liquid of said sample stream; mixing proportioned streams of the diluent-indicator mixture and the oil-continuous liquid of said sample stream to produce a substantially homogeneous stream; passing light through said substantially homogeneous stream; and controling the amount of the reagent which is continuously mixed with the stream of oil in such manner as to maintain substantially constant the light transmitted by said substantially homogeneous stream.

6. A colorimetric method of testing an oil-continuous, multiple-phase liquid stream formed by adding to an oil a chemical reagent capable of reacting with some component of the oil to produce reaction products dispersed in the oil and thus produce a stream of multi-phase oil-continuous liquid, said method including the steps of: proportioning into said stream an indicator and an alcoholic diluent containing a small amount of water, said phases being soluble in said diluent to produce a homogeneous stream, said indicator changing in color with the hydrogen ion activity of said homogeneous stream; and sending light through said homogeneous stream, the amount of transmitted light varying with the color of said indicator.

7. In an apparatus for controlling the potential applied to a controller for regulating the amount of a chemical reagent which is continuously added to and mixed with a stream of liquid to form a major stream, said reagent being reactable with a component of said liquid, the combination of: a sample means for withdrawing from said major stream a representative sample stream, said means including a discharge pipe for said sample stream; a mixing means communicating with said discharge pipe to receive said sample stream; a sample cell providing inlet and outlet pipes, said inlet pipe being in communication with said mixing means; a source of an indicator which changes color in response to change in hydrogen ion activity in said sample stream; a first reciprocatory positive-displacement pump intaking from said source and connected to said mixing means for delivering said indicator to said mixing means at a rate determined by the pumping rate of said first pump; a second reciprocatory positive-displacement pump providing an intake connected to said outlet pipe of said cell, said second pump having a higher volumetric displacement rate than said first pump and thus drawing the sample stream into said mixing means at a rate corresponding to the difference in displacement rates of said pumps, said indicator and said sample stream mixing in said mixing means to form an indicator-containing liquid which flows through said cell; a drive for intermittently operating said positive-displacement pumps in step with each other and in such opposite phase that said second pump intakes during the discharge of said first pump and vice versa; a light source for sending light through said cell and the liquid flowing therein, the amount of light absorbed being determined by the color of said indicator-containing liquid passing through said sample cell; a photocell positioned to receive the light transmitted through said liquid in said cell and producing a potential varying with said transmitted light; and circuit means responsive to this potential for producing said potential applied to said controller and for controlling the latter potential to maintain said transmitted light substantially constant.

8. In an apparatus for controlling a valve admitting a stream of a reagent to a stream of liquid to be treated, said streams being mixed to form a major stream flowing under pressure in a conduit, said valve being operated by an electrically-actuated controller having an input circuit, the combination of: a first reciprocatory positive-displacement proportioning pump comprising walls defining a first variable-volume chamber, one of said walls being reciprocable to change the volume of said first chamber; a source of a modifying liquid miscible with the liquid of said major stream; an intake pipe extending between said source and said first chamber; a check valve in said intake pipe admitting modifying liquid to said chamber from said source upon expansion of said chamber but preventing reverse flow upon contraction of said chamber; a mixing means; a check-valve-equipped pipe interconnecting said first chamber and said mixing means for delivering modifying liquid from said chamber to said mixing means upon contraction of said chamber but preventing return flow upon expansion of said chamber; a sample line interconnecting said conduit and said mixing means for delivering to the latter a sample stream of the material of said major stream, said sample stream and said modifying liquid mixing in said mixing means to form a modified liquid; a check valve in said sample line permitting flow toward said mixing means but blocking reverse flow; a second reciprocatory positive-displacement proportioning pump comprising walls defining a second variable-volume chamber, one of such walls of said second pump being reciprocable to change the volume of said second chamber; a test cell; a pipe connecting said mixing means and said test cell for delivering said modified liquid from said mixing means to said test cell; a pipe connecting said test cell and said second chamber to deliver said modified liquid from said test cell to said second chamber upon expansion of the latter; a check-valve-equipped discharge pipe for conducting said modified liquid from said second chamber upon contraction of such chamber but preventing reverse flow; mechanism for reciprocating said reciprocable walls of said first and second proportioning pumps in step but in opposed phase to contract said first chamber while expanding said second chamber and vice versa, the volumetric displacement rate of said second pump being greater than that of said first pump and thus drawing said sample stream into said mixing means at a rate dependent upon the difference in said volumetric displacement rates of said pumps; means for establishing an electrical potential varying with the hydrogen ion activity of said modified liquid flowing through said test cell; and circuit means for delivering corresponding variations in potential to said input circuit of said controller to vary the amount of reagent delivered to said stream of liquid to be treated.

9. A method as described in claim 1 in which the liquid is an oil and in which the reagent forms a dispersed phase when mixed with said liquid.

WILLIAM F. EBERZ.

REFERENCES CITED

The following references are of record in the file of this patent:

UNITED STATES PATENTS

| Number | Name | Date |
|---|---|---|
| 537,384 | Cook | Apr. 9, 1895 |
| 1,275,200 | Barnickel | Apr. 19, 1921 |
| 1,872,503 | Fepschleger | Aug. 16, 1932 |
| 1,919,858 | Pettingill | July 25, 1933 |
| 1,960,615 | Baker | May 24, 1934 |
| 2,047,985 | Weir | July 21, 1936 |
| 2,063,140 | Allison | Dec. 8, 1936 |
| 2,064,799 | Jones | Dec. 15, 1936 |
| 2,327,569 | Thurman | Aug. 24, 1943 |

OTHER REFERENCES

Muller, I. & E. Chem., vol. 20 #4, April 2, 1928.

Evans, Determination of Acidity in Insulating Oil, I. & E. Chem., Anal. Ed., 8, 1936, pages 287–291.

Davenport, "A Photoelectric Device for Recording Variations in the Concentration of a Colored Solution," Journal of Scientific Instruments, May 1944, pp. 84–86.